United States Patent

Jouillat et al.

[11] Patent Number: 5,566,865
[45] Date of Patent: Oct. 22, 1996

[54] MANUAL ATOMIZING PUMP WITH ADJUSTABLE DOSAGE

[75] Inventors: Claude Jouillat, Montigny-Sur-Avre; Hervé Pennaneac'h; Michel Theot, both of Verneuil-Sur-Avre, all of France

[73] Assignee: Valois S.A., Le Neubourg, France

[21] Appl. No.: 359,633

[22] Filed: Dec. 20, 1994

[30] Foreign Application Priority Data

Dec. 22, 1993 [FR] France .................................. 93 15429

[51] Int. Cl.$^6$ .................................................. G01F 11/06
[52] U.S. Cl. ...................... 222/287; 222/309; 222/321.9; 222/341
[58] Field of Search ..................... 222/287, 309, 222/321.7, 321.8, 321.9, 341, 380, 385; 285/259, 382

[56] References Cited

U.S. PATENT DOCUMENTS

| | | | |
|---|---|---|---|
| 1,241,654 | 10/1917 | Osgood | 285/282 X |
| 2,521,433 | 9/1950 | White | 222/43 |
| 3,216,624 | 11/1965 | Corsette | 222/182 |
| 3,711,130 | 1/1973 | Betzler | 285/259 X |
| 4,072,247 | 2/1978 | Yamazaki | 222/47 |
| 4,856,677 | 8/1989 | Brunet et al. | 222/309 X |
| 4,930,999 | 6/1990 | Brunet et al. | 222/321.9 X |
| 5,096,097 | 3/1992 | Lina | 222/385 |
| 5,183,187 | 2/1993 | Martin et al. | 222/309 X |
| 5,211,429 | 5/1993 | Charlson et al. | 285/259 X |
| 5,411,181 | 5/1995 | Knickerbocker | 222/309 |

FOREIGN PATENT DOCUMENTS

| | | | |
|---|---|---|---|
| 0342651 | 11/1989 | European Pat. Off. . | |
| 0437139 | 7/1991 | European Pat. Off. . | |
| 1101114 | 9/1955 | France . | |
| 1141189 | 8/1957 | France | 285/259 |
| 1486392 | 6/1967 | France . | |
| 2305241 | 10/1976 | France . | |
| 0942161 | 4/1956 | Germany | 222/309 |

*Primary Examiner*—Joseph Kaufman
*Attorney, Agent, or Firm*—Sughrue, Mion, Zinn, Macpeak & Seas

[57] ABSTRACT

A metering pump for dispensing a predetermined volume of a liquid or semi-liquid fluid includes a pump body 1, a differential piston 51,52, and a turret 6 secured to a container cap 61. The pump body has a bottom end in communication with the container and a top end 11 capable of being fixed in a desired axial position on the turret. The piston is mounted for fluid-tight sliding in the pump body and has a rest position in which it defines a pump chamber 3, the piston being urged by a return spring 7 towards the turret. The top end 11 of the pump body is axially adjustable within the turret to vary the volume of the pump chamber, and includes integral barb projections 111 that bite into the softer turret material.

4 Claims, 2 Drawing Sheets

MANUAL ATOMIZING PUMP WITH ADJUSTABLE DOSAGE

BACKGROUND OF THE INVENTION

The present invention relates to a manual spray pump with variable volume, and more particularly a manual pump designed for spraying or dispensing a liquid fluid such as a perfume, a cosmetic, a pharmaceutical, or indeed a semi-liquid fluid such as a cream.

For example, French patents Nos. 1 486 392 (Rudolph Albert) and 2 305 241 (Société Technique de Pulvérisation—S.T.E.P.) disclose such pumps, each comprising a cylindrical pump body in which there slides a hollow piston provided with an outlet channel. The pump body and the piston define a pump chamber that normally contains the fluid to be sprayed or dispensed, and that communicates with a fluid tank via an inlet orifice. In addition, a valve rod disposed in the pump chamber is urged by a spring towards a valve seat formed on the piston, thereby closing the outlet channel and urging the piston towards a rest position in which the volume of the pump chamber is at a maximum. The valve rod is secured to a differential piston capable of sliding on or in an internal cylindrical portion of the pump body which is in communication with the fluid tank via the inlet orifice.

When the piston is actuated against the urging of the spring, the differential piston closes communication between the pump chamber and the fluid tank, either by means of an inlet non-return valve integrated in the differential piston, or else by means of the differential piston engaging in or on the inside cylindrical portion of the pump body. Actuation of the piston tends to reduce the volume of the pump chamber, thereby increasing the pressure in the pump chamber: the increased pressure acts on the differential piston to move the piston away against the urging of the spring, thereby opening the outlet channel of the piston through the valve rod, and thus causing a volume of fluid contained in the pump chamber to be expelled via the outlet channel as the piston moves in the pump body.

When the piston is no longer actuated, the spring urges the valve rod back towards the piston, thereby closing the outlet channel, after which it urges the piston back to its rest position. During this movement, the volume of the pump chamber increases, such that suction is established in the pump chamber. When the differential piston includes an inlet valve, the suction opens the inlet valve and causes the fluid to be admitted into the pump chamber from the beginning of the return movement of the piston. Otherwise, i.e. if communication between the pump chamber and the tank is interrupted by engagement of the differential piston on or in the cylindrical inside portion of the pump body, then the fluid enters the pump chamber only after the piston has returned to its rest position, in which the engagement has ceased.

In prior art pumps of the general type described above, the volume of delivered fluid is fixed. This volume depends on two parameters, namely the section of the pump chamber and the stroke of the piston: the section of the pump chamber is naturally unalterable, and in prior art pumps the stroke of the piston is determined by a top abutment and by a bottom abutment that are secured to the pump body and that are therefore fixed.

This can be a drawback, for example when the pump contains a pharmaceutical: with a conventional pump, there is no way of varying the dose that is delivered, e.g. as a function of the condition or the age of the patient. Also, with conventional pumps, two pumps that deliver different volumes necessarily include parts that are different and, assuming that the parts are made of molded plastics material, thus requiring some of the manufacturing molds to be different. The pump manufacturer is thus obliged to have additional molds, and molds are known to be very expensive.

An object of the present invention is to avoid those drawbacks by providing a variable volume pump.

It is known from document FR-1 101 114 that the stroke of the piston can be varied by means of a screwable ferrule that acts as the bottom abutment. By screwing in the ferrule to a greater or lesser extent, the volume of fluid that is delivered can be influenced. However, the ferrule constitutes an additional element in the pump. Like all the other components of the pump, that element must be molded and assembled. Molding requires a distinct mold to be made, and assembly requires a machine capable of taking hold of the element, orienting it properly, and then inserting it. In addition, since in is an element with a screw thread, the part which receives it must also have a thread. That all contributes to increasing the cost of the pump.

SUMMARY OF THE INVENTION

An object of the present invention is to define a variable volume pump which does not include any additional element for performing the function of varying the volume delivered, and which is also easy to mold.

To do this, the present invention provides a metering pump for dispensing a determined volume of a liquid or semi-liquid fluid contained in a tank, the pump being substantially symmetrical about an axis and comprising a pump body, a piston, and a fixed structural element secured to the tank, the pump body having a bottom end in communication with said tank and a top end capable of being fixed in position on the fixed structural element. The piston is mounted for fluid-tight sliding in the pump body and has a rest position in which it defines a pump chamber, the piston being urged by a return spring towards the fixed structural element which, in the rest position of the piston, takes up the force exerted by the return spring. The pump is provided with adjustment means for adjusting the volume of the pump chamber by axial displacement of the top end of the pump body relative to the fixed structural element.

In a first practical embodiment, the fixed structural element is a turret, the adjustment means including fastening means provided on the pump body in the vicinity of the top end thereof, the fastening means co-operating with an inside surface of said turret in such a manner as to enable relative axial displacement of the position in which the pump body is fixed in the turret. Advantageously, the turret is made of a material that is not as hard as the material constituting the top end of the pump body, the fastening means constituting at least one projection formed on the top end of the pump body and adapted to bite into the inside surface of the turret with a non-return or "barb" effect. In a variant, the fastening means are constituted by a screw thread, the inside surface of the turret being smooth so as to receive the screw thread by interference. The screw thread bites into the turret, thereby forming a complementary screw thread therein by a self-tapping action. In the first version that uses a barb effect, it is necessary immediately after assembly of the pump and prior to adjustment of the pump chamber volume, for the pump body to be positioned relative to the turret as a function of the axial displacement direction that is allowed by the barb-forming projection. A property of the barb effect is to allow displacement in one direction only while preventing displacement in the opposite direction. After assembly, the volume of the pump chamber is adjusted in the workshop by means of a machine capable of applying sufficient force to the mutually-slidable pump elements to adjust the volume in question to a desired value. It is not that the end user would be incapable of causing the volume of the pump chamber to vary, but that the end user cannot do so accurately. In contrast, in the screw version, the volume of the pump chamber can be adjusted on several different occasions, as a function of the volumes of fluid to be delivered.

BRIEF DESCRIPTION OF THE DRAWINGS

Other characteristics and advantages of the invention appear from the following detailed description of four embodiments of the invention given as non-limiting examples and with reference to the accompanying drawings.

In the drawings.

DETAILED DESCRIPTION OF THE PREFERRED EMBODIMENTS

The principle of the invention, i.e. adjusting the volume of the pump chamber, is not applicable to all kinds of pumps. It can be applied only to pumps in which the effect of a relative displacement of the top dead center position of the piston relative to the pump body has the effect of varying the volume of the pump chamber. The figures illustrating the present invention and described in detail below, show one type of pump that incorporates the invention. Naturally, other types of pump (not described) suitable for operating with the present invention can be designed, without thereby going beyond the ambit and the scope of the invention as defined by the claims.

Figure 1A:
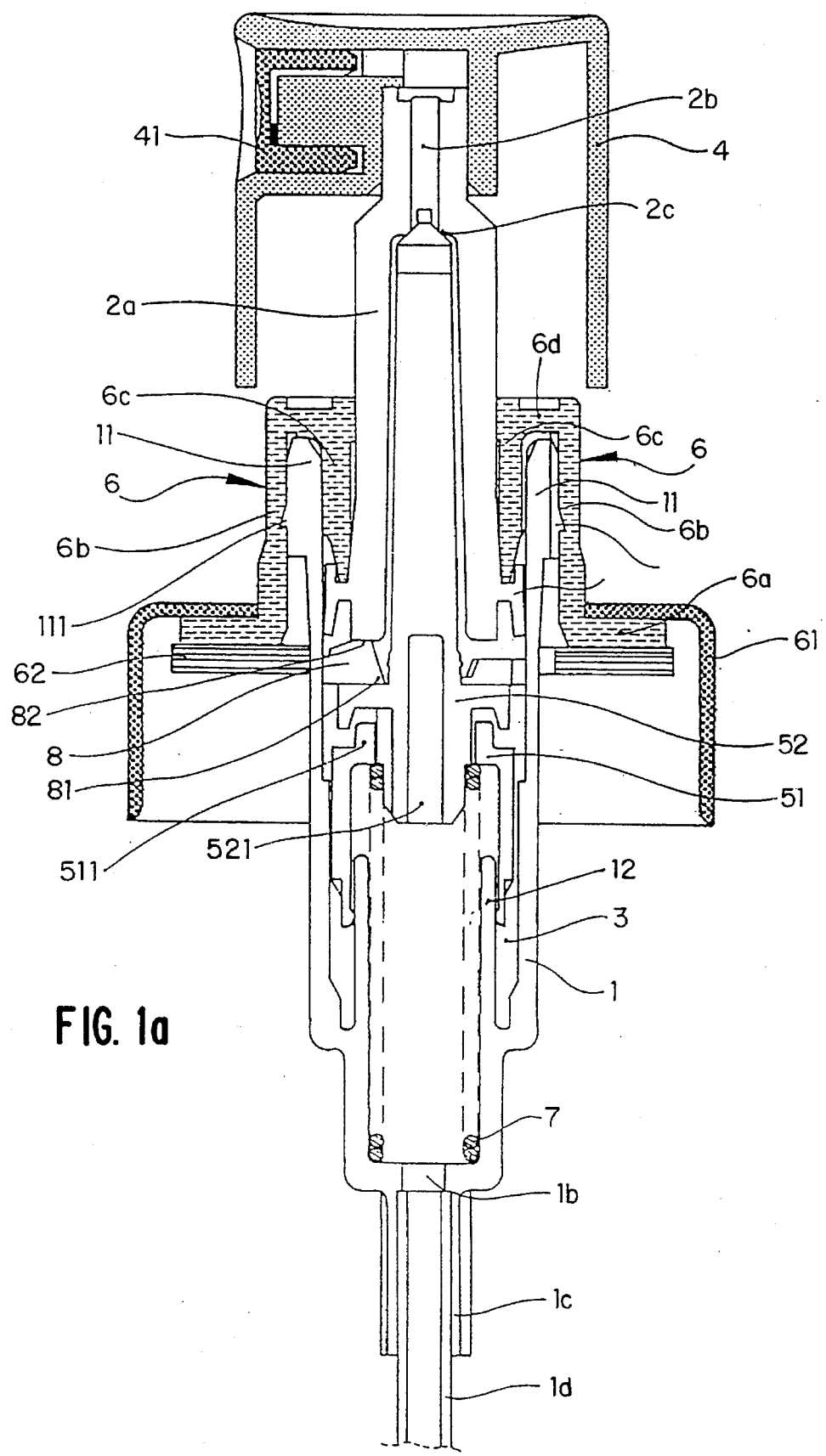
FIG. 1a is a section view through a pump made in accordance with the present invention and shown in its high position where it defines a minimum volume for the pump chamber.
Figure 1B:
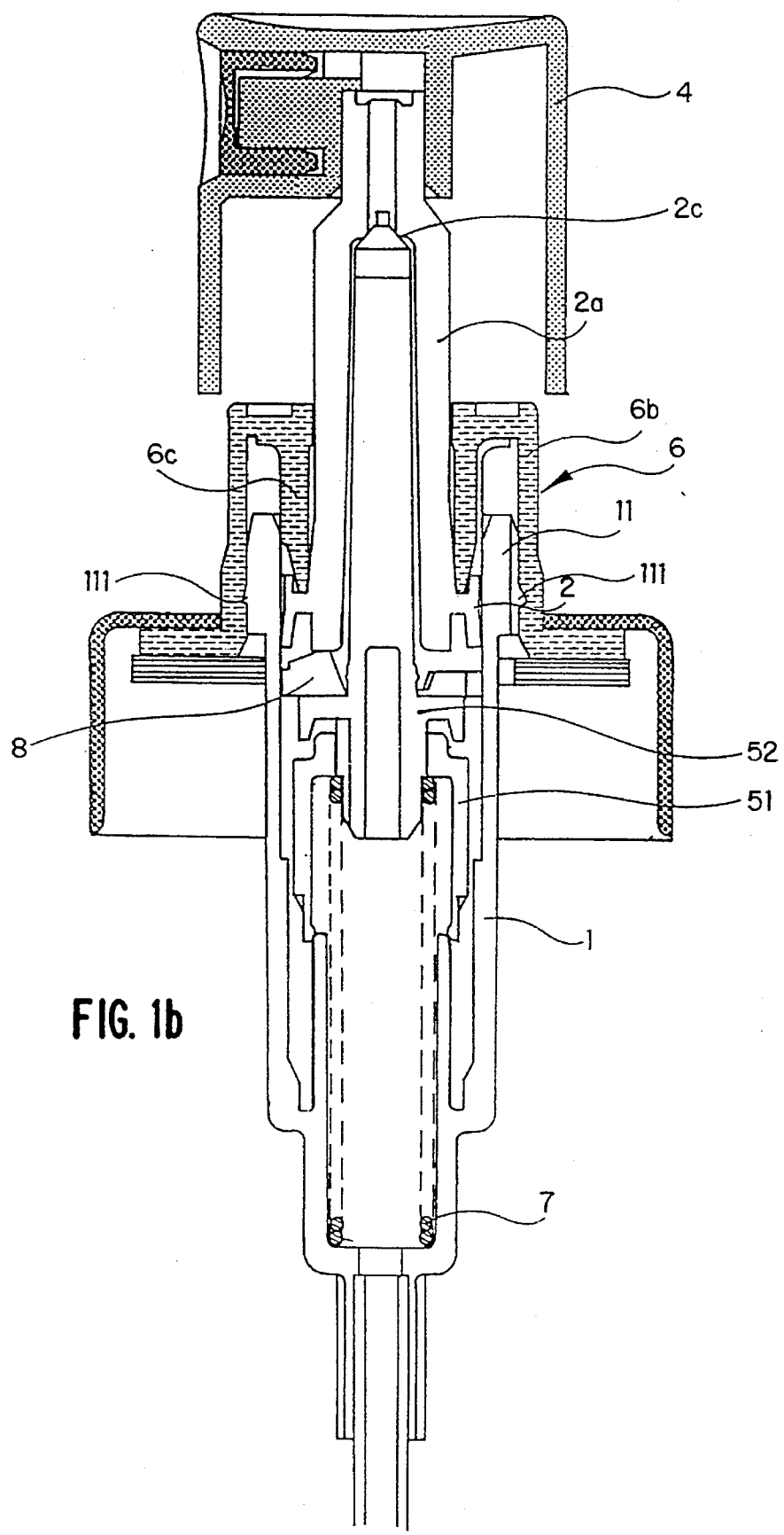
FIG. 1b is a view of the same pump as that shown in FIG. 1a but shown in its low position that defines a maximum volume for the pump chamber.

FIGS. 1a and 1b show a different embodiment of the present invention implemented on a special type of pump that incorporates simultaneously the essential characteristics of European patents Nos. 0 342 651 and 0 437 139. The first of those patents teaches using a piston member constituted by a differential piston and a hollow piston that interact in such a manner as to enable the pump chamber to be filled progressively while the pump member is rising. The second patent solves the problem of priming the pump, i.e. of filling the pump chamber for the first time. This is done by interposing a cam part between the piston and the differential piston, enabling the differential piston to be separated from the piston at the location where the punch is engaged in the seat of the outlet valve when the piston reaches the end of its stroke in the pump chamber, thereby establishing an opening that allows the compressed air initially contained in the pump chamber to escape. A full and precise description of a pump of the invention incorporating the above filling and priming means is given with reference to FIG. 1a.

With reference to FIGS. 1a and 1b which show a pump having its pump chamber adjusted respectively to its minimum position and to its maximum position, it can be seen that the pump comprises in conventional manner a hollow cylindrical pump body 1 slidably receiving a piston 2, thereby defining a pump chamber 3.

The piston 2 extends towards the outside of the pump body 1 in the form of a hollow push rod 2a that includes a central channel 2b. The central channel 2b opens out firstly to the outside of the pump body 1, and secondly to the inside of the pump body 1 where a valve seat 2c is formed on the piston 2. The top end of the push rod 2a is covered by a pushbutton 4 fitted with a nozzle 41. The pump body 1 extends between an open end 11 through which the piston and push rod 2a pass to a bottom end that forms a throttle 1b which communicates with the tank of fluid via an inlet duct 1c that is extended by a dip tube 1d. The top open end 11 of the pump body 1 is secured by snap-fastening inside a turret 6 which is formed with an internal housing that is specially designed for receiving the reinforced end portion 11 of the pump body 1. During assembly, the pump body is thus snap-fastened in stationary and definitive manner without any subsequent adjustment being possible. The term "turret" is used herein to designate the part that enables the pump body 1 to be joined in fixed manner to the crimpable or screwable cap 61. This part comprises a base 6a which is wedged between a gasket 62 and the cap 61, an outer cylindrical portion 6b, and an inner cylindrical portion 6c, the two cylindrical portions being connected together by a washer-shaped spacer 6d. The above-specified housing in the turret lies between the joined-together inner and outer cylindrical portions 6b and 6c. In an implementation detail, connection to the outside air is achieved via a passage formed through the gasket 62 and between the end portion 11 of the pump body and the turret by forming projections on the top end 11 that allow air to pass through. The air finally escapes by passing between the inner cylindrical portion 6c and the piston 2.

The pump body also includes a tubular portion 12 projecting upwards into the pump chamber 3 and co-operating with a skirt 51 adapted to engage in fluid-tight and sliding manner on the tubular portion 12 to form an inlet valve that serves to isolate the pump chamber 3 from the tank. The skirt 51 co-operates with a punch member 52 to form a differential piston 5 that incorporates a filling valve and that has two differential characteristics, as explained below. The punch member 52 has a guide finger 521 at its bottom end, and the finger has a shoulder that bears against a return spring 7 which rests on the bottom portion of the pump body 1. The top end of the return spring which bears against the shoulder also serves as an abutment for the skirt 51, which is thus free to move axially over a certain distance between a position in which it is in contact with the spring and corresponding to the filling valve being maximally open, and a position in which it is in contact with the valve head of the punch, in which position the valve is hermetically closed.

The punch member also forms a valve head that is adapted to co-operate in fluid-tight contact with the top portion 511 of the skirt 51 as the piston 2 moves downwards. The punch member extends upwards in the form of a rod whose end is chamfered so as to form a cone that is adapted to come into fluid-tight contact with the outlet valve seat 2c so as to isolate the pump chamber from the outside when the pump is at rest, and when the return spring 7 urges the piston 2 against the valve seat 2c.

The present embodiment of the invention also includes a cam part 8 as defined in European patent No. 0 437 139. It is in the form of a washer whose structure includes projections that project to a greater or lesser extent. The part 8 is interposed between the piston 2 and the punch member 52.

The shape of this part with its projections that extend to a greater or lesser extent serves to allow not only fluid to pass but also the air that is initially contained in the pump chamber.

For a better understanding of this pump, it is appropriate to describe its operation both during an actuation cycle for priming and during a cycle for dispensing a liquid or semi-liquid fluid. In the initial state, after assembly, the pump chamber contains only air. By pressing on the pushbutton 4, the piston 2 is caused to move down, taking with it the punch member 52 and the skirt 51. Once it has reached the end of its stroke in the pump body, the piston 2 applies sufficient force to the cam part 8 to cause it to tilt so that its inside edge 81 moves downwards further than does its top edge 82, thereby separating the cone of the punch from its valve seat 2c. An outlet passage is thus created for the air. It can be observed that during priming, the differential piston 5 constituted by the skirt 51 and the punch member 52 serves merely to close the filling valve and the inlet valve, with this mechanism being described in greater detail below.

When dispensing a liquid or a semi-liquid, the hydrodynamic phenomena are more complex. The skirt 51 remains permanently engaged on the tubular portion 12, since further upwards motion of the skirt 51 would have no effect on the volume of the pump chamber, given that the fluid would merely be returned to the tank during the initial portion of pump actuation. Thus, when a force is applied axially to the pushbutton 4, the punch member 52 and the skirt 51 begin by making contact in fluid-tight manner, closing the annular passage that is defined between them. This contact is achieved by the fact that the punch member 52 moves down and the skirt 51 stays in place because of its fluid-tight sliding engagement on the tubular portion 12. From this moment, the pressure rises inside the pump chamber, given that both the inlet and the outlet valves are closed, as is the filling valve. A hydrodynamic explanation is now useful in order to understand the operation of the differential piston. Because it is made up of two distinct parts, advantage muse be taken of the pressure inside the pump chamber both to keep the filling valve closed and also to open the outlet valve during the downwards motion of the piston 2. This is achieved by an appropriate choice of the sections of the two component parts of the differential piston that are in contact with the outside and with the inside of the tank. Specifically, to enable the punch 52 to be separated from its valve seat 2c, it is necessary for the force generated by the axial resultant of the pressure to be greater on the cone of the punch 52 than on the valve head at the point of contact with the skirt 51. Thus, once the pressure inside the pump chamber has reached a level that is sufficient to overcome the force of the spring 7, the punch separates from its seat. This condition on contact section is essential and can clearly be seen to apply in the figures. The skirt 51 muse satisfy the same condition as the punch 52, except that the force difference generated by the axial resultant of the pressure must be directed upwards against the punch 52 in such a manner as to reinforce the fluid-tight contact between these two parts.

To do this, the contact section between the skirt 51 and the punch 52 must be greater than that between the skirt and the tubular portion 12. Once the pressure has reached the value that is predetermined as a function of the strength of the return spring 7, the outlet valve opens and the fluid is expelled to the outside by the pressure then existing inside the pump chamber. This key point is reached before the skirt 51 comes into abutment at the bottom of the pump chamber; thus, the priming cam part 8 has no effect so long as there is fluid present in the chamber. In theory, the part 8 is used once only, i.e. when the pump is primed, or perhaps on a subsequent occasion should the pump ever become unprimed. Once the pressure has dropped and the piston has begun to move back up, suction is established and the filling valve between the skirt 51 and the punch 52 then opens so fluid can thus be sucked progressively into the pump chamber while the cone of the punch has returned to its position of contact against the outlet valve seat 2c. Filling thus continues until the piston has moved all the way back up.

The description of the means and of the operation of those two known filling devices is helpful in understanding their actions which are performed together. In particular, this disposition is advantageous for dispensing semi-liquids such as creams, since without the cam part it is practically impossible to prime the pump, and without the two-part differential piston, it is practically impossible to fill the pump. Those two characteristics in combination have been chosen for application of the present invention since that produces an optimum result. Nevertheless, other types of pumps could naturally be used with the present invention whose essential characteristic is described and explained below.

Whereas it is common practice to make use of a separate part for adjusting the volume of the chamber, the embodiment of the invention incorporates the adjustment means directly in the essential component parts of the pump. According to the invention, the top end 11 of the pump body 1 is formed with a projection 111 that is adapted to bite into the turret 6, and in particular into its outer cylindrical portion 6b. For this purpose, it is necessary for the projection 111 to be made of a material having greater hardness than the material of the turret 6. It is possible to use the same respective materials as are used in the embodiments of FIGS. 1a and 1b. After assembly, the pump is initially in a configuration as shown in FIG. 1b, which configuration corresponds to the pump chamber having a maximum volume. Thereafter, the pump can have its volume adjusted down to a minimum value which corresponds to the position of the pump body that is shown in FIG. 1a. The adjustment displacement direction could be inverted merely by inverting the profile of the projection 111 which implements a barb effect.

The barb effect is particularly suitable for automatic adjustment in a workshop by means of an appropriate device. The pump body and integral projection 111 can be molded in a manner that is very simple and of low cost. In this case, fixing is based on the difference in hardness between the materials used, and not on complex mechanical means.

The essential advantage of using a barb-forming top end 11 lies mainly in the fact that no extra part is required, thus reducing the number of molding steps. As a result, the cost of manufacturing the pump is increased very little due to the additional capacity provided for adjusting the volume of the chamber.

The projections 111 for achieving the barb effect preferably extend transversely to the allowable displacement direction, i.e. horizontally if the pump is vertical. By providing the projections 111 with a particular slope relative to the horizontal and by ensuring that they extend discontinuously around a fraction of the outline of the top end 11 of the pump body, it is possible to obtain a screw thread. The volume of the pump chamber can then be adjusted by screwing the pump body relative to the turret. The essential advantage obtained by screwing is that the adjustments can be reversed, i.e. it is possible to vary the pump chamber volume at will in one direction or in the opposite direction. Conversely, when using the barb effect on its own, the pump chamber must be adjusted in the factory, whereas with the screw version the adjustments can be performed manually by anyone. It is even possible to provide volume marks on the pump body for displaying the capacity of the pump chamber.

When the projections act as screw threads, it is possible to make the turret 6 with complementary threads on its inside face. However, it is preferable to make the turret out of a material that is not as hard as the material of the pump body so that the screw threads bite into it and form complementary screw threads by a self-tapping action. This avoids any need to mold a screw thread on the turret.

We claim:

1. A metering pump for dispensing a predetermined volume of a liquid or semi-liquid fluid contained in a tank, said pump being substantially symmetrical about a longitudinal axis, and comprising:

a pump body (1), a piston (51,52), and a fixed structural element (6) adapted to be secured to said tank, said pump body having a bottom end in communication with said tank and a top end (11) capable of being fixed in position on said fixed structural element, said piston being mounted for fluid-tight sliding movement in said pump body and having a rest position in which it defines a pump chamber (3), the piston being urged by a return spring (7) towards said fixed structural element, wherein in said rest position, said fixed structural element bears the force exerted by the return spring, the pump being provided with adjustment means (111) for axially displacing the top end (11) of the pump body relative to said fixed structural element without concurrently displacing the rest position of the piston relative to the fixed structural element, to attendantly adjust the volume of the pump chamber to said predetermined volume.

2. A metering pump according to claim 1, wherein said fixed structural element is a turret (6), and said adjustment means includes fastening means provided on said pump body in the vicinity of the top end (11) thereof, said fastening means cooperating with an inside surface (6*b*) of said turret to enable relative axial displacement of the position at which the pump body is fixed in said turret.

3. A metering pump according to claim 2, wherein the turret (6) is made of a material softer than the material constituting the top end (11) of the pump body, said fastening means comprising at least one projection (111) formed on said top end of the pump body and adapted to bite into said inside surface (6*b*) of the turret with a non-return or "barb" effect.

4. A metering pump according to claim 2, wherein said fastening means comprise a screw thread, the inside surface of the turret being smooth so as to receive said screw thread in a self-tapping manner.

* * * * *